March 21, 1933.  F. RATKOVSZKY  1,902,466
APPARATUS FOR REGULATING ALTERNATING CURRENT CIRCUITS
Filed May 28, 1928

Inventor
Ferencz Ratkovszky

Patented Mar. 21, 1933

1,902,466

UNITED STATES PATENT OFFICE

FERENCZ RATKOVSZKY, OF BUDAPEST, HUNGARY, ASSIGNOR, BY MESNE ASSIGNMENTS, TO GENERAL ELECTRIC COMPANY, OF SCHENECTADY, NEW YORK

APPARATUS FOR REGULATING ALTERNATING CURRENT CIRCUITS

Application filed May 28, 1928, Serial No. 281,056, and in Hungary May 28, 1927.

This invention relates to an apparatus which permits regulating the tension at any desired location in an alternating current distribution system, so as either to increase or to diminish the tension of the current so regulated by means of an additional tension.

The apparatus constituting the subject of the present invention comprises a transformer composed of two separate cores or a single core, such as a three-legged core, to provide two closed flux paths. Each of these paths are provided with a secondary winding, a control winding and a primary winding, the latter being a united winding in case of a single (as three-legged) core. The secondary winding is in circuit with the main line carrying the alternating current which is to be regulated, while the primary winding is formed by a shunt connected across the main line, the corresponding windings of each path being connected in series. The control winding forms part of an independent circuit which is arranged to prevent large voltage drops in the main line when the load is increased. The secondary and primary windings are so arranged that the fluxes induced in each of the transformer cores tend in one case to oppose and in the other case to amplify each other.

If no branch is short-circuited, there occurs, as soon as load is put on the system, a voltage drop of quite considerable magnitude, depending on the magnitude of the load. This results from the powerful magnetic field set up in the closed iron core of the coils due to current flowing in the secondary windings and superposed on the voltage winding. It appears therefore advisable to connect the auxiliary coils in such a manner that they prevent the voltage drop resulting from an increase in load.

For this purpose the two auxiliary coils are so connected that if in both magnetic circuits the fluxes are of equal magnitude, the tensions set up in the control coils oppose and neutralize each other. If, however, the fluxes are different, equalizing counter currents are set up which tend to keep the fluxes at equal magnitude, thus preventing the occurrence of powerful magnetic fields when a load is applied, the existence of which might occasion an appreciable voltage drop.

The regulation of the tension of the secondary is effected by short circuiting one or the other of the control windings either gradually over an inductive or ohmic resistance or instantaneously by means of switches. The control coil which has been short-circuited causes the primary flux, and consequently the voltage induced in the secondary winding of one flux path, to be greatly reduced and overbalanced by the voltage induced in the secondary winding of the other flux path. Owing to the fact that the voltage induced in the two secondary windings acts in opposite directions the voltage to be regulated is in one case reduced and the other case increased.

When it is desired to regulate the tension by short-circuiting one or the other control coil, it is necessary that simultaneouly with effecting the short-circuiting, the connection between the coils should be broken.

The most practical method of attaining this end is by effecting the short-circuiting of the coils and the interruption of the circuit by one and the same switching device.

The accompanying diagrammatic drawing illustrates by way of example two embodiments of the invention.

Figure 2:
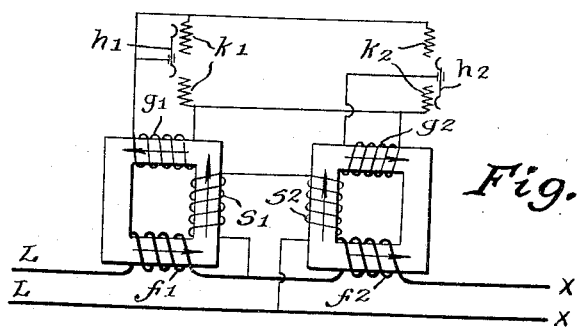
Fig. 2 shows an apparatus consisting of two separate transformers.

Referring to Fig. 2 of the drawing $f_1$ and $f_2$ denote the two secondary coils which are connected into the circuit L L and induced by the primary coils $s_1$ and $s_2$, whereas $g_1$ and $g_2$ denote the two control coils adapted to be short circuited by the switching means $h_1$ and $h_2$ over resistance $k_1$ and $k_2$ respectively.

In the drawing the control coil $g_2$ is shown short circuited, the coil $g_1$ being open. Consequently a voltage is induced in the secondary coil $f_1$ under the action of the primary coil $s_1$ and this voltage may be supposed to be added to the voltage L thus increasing this latter. If it is desired to pass to an intermediate stage of the control in which the effects of the coils $f_1$ and $f_2$ are equal but opposite, the short-circuit must be removed from $g_2$ and the two coils $g_1$ and $g_2$ interconnected so that the same flux occurs in both magnetic circuits. If the short-circuit is first removed from $g_2$ and the two coils subsequently interconnected undesirable voltage fluctuations may occur in the supply system due to a large flux change occurring in the iron cores during the short interval when $g_1$ and $g_2$ are not interconnected. Consequently this should be avoided. On the other hand, if the two coils are interconnected before the short-circuit is removed from $g_2$ then both coils are short-circuited. Thus it is preferred to effect the transition from short-circuit of one coil to short circuit of the other coil over a transition resistance. If the sliding contact $h_2$ is moved outwards the short circuit of the coil $g_2$ is gradually removed and the coil $g_2$ is connected with the coil $g_1$ by way of a progressively diminishing resistance. The resistances $k_1$, $k_2$ could be replaced by positively controlled water resistances.

The disposition and arrangement of the control coils may be other than that illustrated in the accompanying drawing provided that the provision for the interconnection of the terminals of the coils is such as to ensure that no equalizing currents are set up in the coils if the flux in the two iron paths are equal but as soon as the two fluxes differ, the currents begin to flow and tend to restore the original condition.

Figure 1:
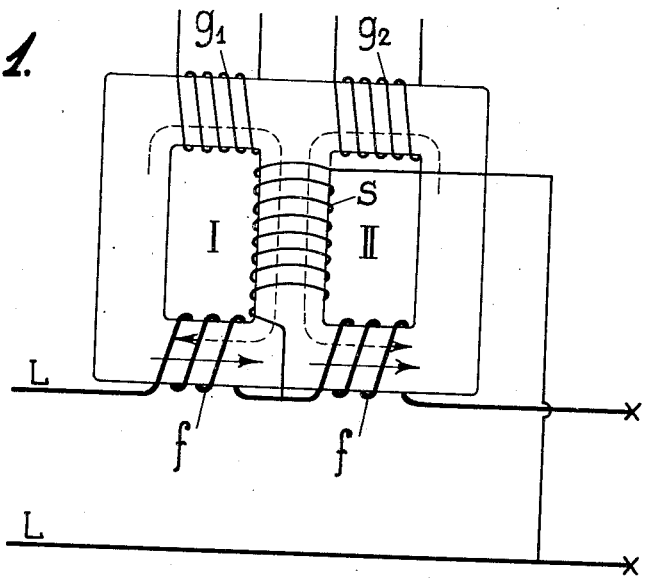
Fig. 1 shows an apparatus consisting of a single three legged transformer.

The two magnetic circuits, i. e. flux paths, may also be united on a common iron core as shown in Fig. 1, in which similar references denote identical parts. The open end points of the coils $g_1$ and $g_2$ are understood to be completed according to the short-circuiting means $h_1$, $h_2$, $k_1$, $k_2$ shown in Fig. 2 also in this case.

The devices described may be connected across the alternating current mains at any desired location and permit a regulation of the tension to any desired extent.

It is, of course, also possible to employ more than two series transformers, the control coils of which are short circuited one after the other, so that the regulation may be effected in several stages.

I claim:

1. Apparatus for regulating the tension of an alternating current circuit, comprising transformer means providing two closed flux paths, a series coil for each path, a control coil for each path, a voltage winding connected to the alternating current circuit to be regulated in such manner that the flux generated by the winding flows through the series coils of the separate paths in opposite directions relative to their direction of winding, and means for short circuiting one of said control coils, said means including a variable resistance arranged to regulate the tension in the alternating current circuit.

2. An apparatus for regulating the tension of an alternating current circuit, comprising transformer means providing two closed flux paths, a series coil for each path, a control circuit including a control coil for each path, a voltage winding connected to the alternating current circuit to be regulated in such manner that the flux generated by the windings flows through the series coils of the separate paths in opposite directions relative to their direction of winding, and means for short-circuiting said control circuit for the purpose of regulating the tension in the alternating current circuit, the arrangement being such that when the control circuit is not short-circuited equal neutralizing tensions are set up in the control circuit under the influence of the primary fields in the two paths and no current flows, while when one of the control circuits is short-circuited the tensions are overbalanced and an equalizing current passes through the control circuit.

3. Apparatus for regulating the tension of an alternating current circuit, comprising transformer means providing two closed flux paths, a series coil for each path, a control coil for each path, a voltage winding connected to the alternating current circuit to be regulated in such manner that the flux generated by the windings flows through the series coils of the separate paths in opposite directions relative to their direction of winding, means for establishing and interrupting an electrical connection between said control coils for the purpose of regulating the tension in the alternating current circuit, said connecting means being constructed and arranged to short circuit one of said control coils simultaneously with the interruption of the electrical connection between said control coils.

4. Apparatus for regulating the tension of an alternating current circuit, comprising transformer means providing two closed flux paths, a series coil for each path, a control coil for each path, a voltage winding connected to the alternating current circuit to be regulated in such manner that the flux generated by the windings flows through the series coils of the separate paths in opposite directions relative to their direction of winding, a switch for short circuiting each of said control windings for the purpose of regulating the tension in the alternating current circuit, a switch for establishing and interrupting an electrical connection between said control coils, said switches being simultaneously actuable to short circuit one of said control coils coincident with the interruption of the electrical connection between said control coils.

In testimony whereof I affix my signature.

FERENCZ RATKOVSZKY.

CERTIFICATE OF CORRECTION.

Patent No. 1,902,466.                                                            March 21, 1933.

FERENCZ RATKOVSZKY.

It is hereby certified that error appears in the printed specification of the above numbered patent requiring correction as follows: Page 1, line 53, beginning with the words "The regulation" strike out all to and including the word "increased." in line 68, and insert the same after line 29, same page; and that the said Letters Patent should be read with this correction therein that the same may conform to the record of the case in the Patent Office.

Signed and sealed this 23rd day of May, A. D. 1933.

M. J. Moore.

(Seal)                                                            Acting Commissioner of Patents.